(12) United States Patent
Johnston

(10) Patent No.: US 8,272,831 B2
(45) Date of Patent: Sep. 25, 2012

(54) WATER CURRENT POWERED GENERATING APPARATUS

(75) Inventor: Barry Johnston, Orkney (GB)

(73) Assignee: Scotrenewables (Marine Power) Ltd., Stromness, Orkney (GB)

( * ) Notice: Subject to any disclaimer, the term of this patent is extended or adjusted under 35 U.S.C. 154(b) by 1151 days.

(21) Appl. No.: 11/792,193

(22) PCT Filed: Dec. 12, 2005

(86) PCT No.: PCT/GB2005/004775
§ 371 (c)(1),
(2), (4) Date: Mar. 31, 2008

(87) PCT Pub. No.: WO2006/061652
PCT Pub. Date: Jun. 15, 2006

(65) Prior Publication Data
US 2008/0258465 A1    Oct. 23, 2008

(30) Foreign Application Priority Data
Dec. 11, 2004    (GB) .................................. 0427197.9

(51) Int. Cl.
*F03B 13/26*    (2006.01)
(52) U.S. Cl. ............... 415/3.1; 415/4.3; 415/7; 415/61; 415/906; 416/85; 416/142; 290/42; 290/53

(58) Field of Classification Search .................. 415/3.1, 415/7, 906, 4.3, 61; 416/6, 85, 142; 290/42, 290/53
See application file for complete search history.

(56) References Cited

U.S. PATENT DOCUMENTS

| | | | |
|---|---|---|---|
| 6,652,221 B1 | 11/2003 | Praenkel | |
| 7,105,942 B2 * | 9/2006 | Henriksen | ........................ 290/55 |
| 2002/0158472 A1 | 10/2002 | Robson | |
| 2009/0230686 A1 * | 9/2009 | Catlin | ............................. 290/54 |

FOREIGN PATENT DOCUMENTS

| | | | |
|---|---|---|---|
| DE | 10134509 A1 | | 5/2002 |
| GB | 192396 | | 8/1923 |
| GB | 2256011 | | 11/1992 |
| GB | 2348249 | * | 9/2000 |
| WO | WO 2006/054084 A1 | | 5/2006 |

* cited by examiner

*Primary Examiner* — Edward Look
*Assistant Examiner* — Liam McDowell
(74) *Attorney, Agent, or Firm* — Bishop & Diehl, Ltd.

(57) ABSTRACT

A power generating apparatus suitable for use in extracting energy from the movement of water, in particular tidal movement, is disclosed. The apparatus includes an elongate, generally circular in cross section, buoyancy vessel (1), having depending from its underside on a mounting means, rotatable rotor blades (2). The rotor blades are connected to a power generating means whereby in use of the apparatus movement of water across the rotor blasé, drives them so as to generate power in the power generating means.

9 Claims, 1 Drawing Sheet

WATER CURRENT POWERED GENERATING APPARATUS

TECHNICAL FIELD OF THE INVENTION

The present invention relates to a power generating apparatus for use in extracting energy from the movement of water, particularly tidal movement or other water currents, such as rivers. The invention is particularly directed to a floating apparatus.

BACKGROUND OF THE INVENTION

In recent years there has been a move towards so called renewable energy sources, such as wind and wave power, but wind turbines have a very high visual impact and are, of course, dependent on there being wind. Wave powered generating apparatus has proved difficult to realise effectively for a variety of reasons, not least the generally large costs associated with equipment required to withstand the power of extreme waves that occur during storms.

Tidal energy, on the other hand, is based on a guaranteed energy source, that of the movement of the tides. A great number of tidal powered generating apparatus have been proposed over the years including, for example, International Patent Publication No. WO 88/04632, U.S. Pat. No. 3,986,787, DE 2648318 and U.S. Pat. No. 3,922,012.

The devices of the prior art have generally consisted of very large constructions which have depending from their underside, propellers or turbines which are driven by the motion of tidal currents passing therethrough. Such devices may be floating devices, such as that described in WO88/04632 or submersed (on the seabed) devices such as that described in U.S. Pat. No. 3,922,012.

All of the prior art apparatus known to the inventor suffer from a number of inherent problems, including large and sophisticated designs which do not lend themselves to simple manufacturing techniques and which are prone to damage i.e. they have poor survivability in the sea; and/or are difficult to maintain/repair without the need for expensive handling or installation equipment; and/or required to be "piled" into the seabed.

SUMMARY OF THE INVENTION

It is an object of the present invention to avoid or minimise one or more of the foregoing disadvantages.

The present invention provides a power generating apparatus suitable for use in extracting energy from the movement of water, particularly tidal movement, comprising an elongate, generally circular in cross section, buoyancy vessel, said buoyancy vessel having depending from its underside on a mounting means, rotatable rotor blades connected to a power generating means, whereby in use of the apparatus movement of water across said rotor blades, drives said rotor blades so as to generate power in said power generating means.

Thus with a power generating apparatus according to the present invention the realisation of a simple yet effective means of generating power in tidal locations can be realised. Preferably said rotor blades are connected through said mounting means by means of a hinged joint in a keel section of said vessel, so as to be movable from a first, or stowed position, immediately below the vessel to a second deployed condition facing the direction of tidal currents. With the rotor blades in said stowed position the present invention is advantageously significantly easier to manoeuvre and handle as the elongate cylindrical nature of the vessel allows for the vessel to be "rolled over" so as to permit maintenance of the rotor blades/power generating device without the need for large and expensive barges/cranes. Moreover the ability to stow the rotor blades immediately under the vessel means that the whole apparatus can be readily towed into harbours for maintenance as described above.

The generally cylindrical (in cross section) shape of the vessel is an essential feature of the present invention for a number of reasons, including the fact that a cylindrical vessel is inherently extremely strong and has substantial structural integrity thereby giving improved "survivability" in adverse weather conditions. Moreover the cylindrical vessel means that wave loading and water resistance (drag) is minimised. This again provides for improved survivability.

Preferably there are two rotor blades which, in said stowed or retracted position, may be arranged so as to be parallel with the longitudinal axis of the vessel. This arrangement further facilitates the handling, particularly the towing of the apparatus.

Desirably said rotor blades are mounted in said deployed condition so as to be as close to the vessel as possible as the maximum tidal flow occurs close to the surface of a body of water on which the apparatus is floated.

As the apparatus is not totally submersed it will be appreciated that at least a significant portion thereof will be visible above the surface of the sea and thus visible to seafarers. Desirably the apparatus may be fitted with warning lights or warning devices to alert seafarers to its presence.

The apparatus is designed as a free floating arrangement so that it is independent of vertical tidal displacements.

The apparatus is provided with means, for example mooring means formed and arranged for securing the apparatus to the seabed or other fixed point. Desirably the mooring configuration, preferably a yolk arrangement, allow for remote "quick" release and connection.

Preferably the vessel is provided with ballast tanks, desirably front and rear, and preferably an automatic ballasting system formed and arranged to keep the apparatus in a more or less level orientation depending on the intensity of tidal flow and forces associated with the movement of the rotor blades.

Preferably there are provided means, for example hydraulic rams energised by constantly charged hydraulic accumulators, formed and arranged to lift the rotor blades from the deployed "in use" position to the stowed retracted position for transportation or in the event of adverse weather conditions or system failure.

Preferably said vessel is provided with a bow portion formed and arranged to allow the movement of water to pass around the vessel, for example a conical/frustoconical nose portion.

BRIEF DESCRIPTION OF THE DRAWINGS

Further preferred features and advantages of the present invention will now be described with reference to the accompanying drawings in which.

DETAILED DESCRIPTION OF THE INVENTION

Figure 1:
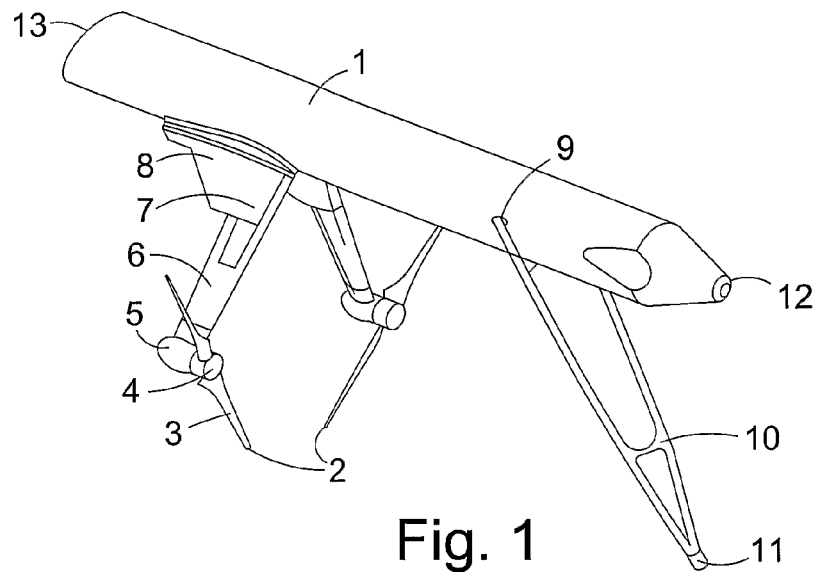
FIG. 1 shows a perspective view of a power generating apparatus according to the invention.
Figure 2A:
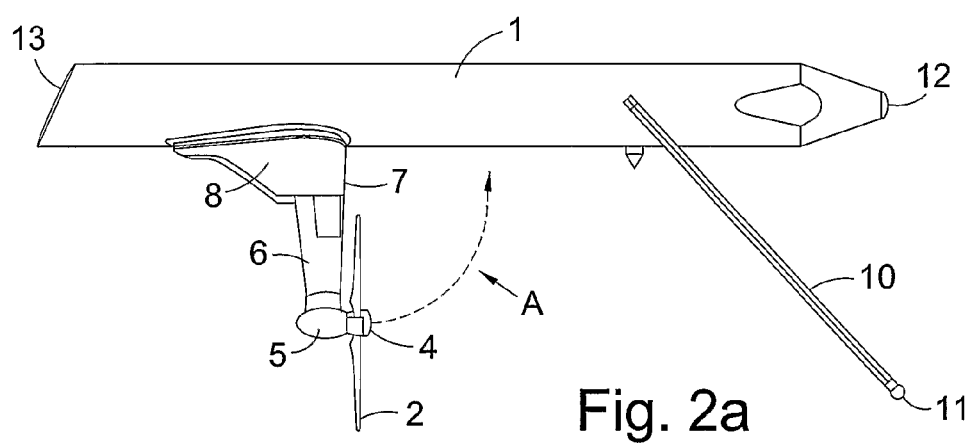
FIG. 2a shows a side view in operation of a power generating apparatus according to the invention.
Figure 2B:
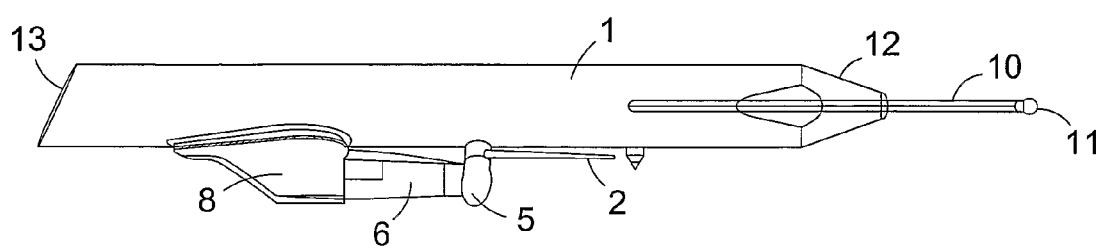
FIG. 2b shows a side view in transportation of a power generating apparatus according to the invention.

An apparatus for extracting power from tidal energy is shown in FIGS. 1, 2a and 2b. The apparatus comprises a cylindrical buoyancy tube 1 which has depending from its underside dual counter-rotating rotors 2 which are driven by rotor blades 3 which rotate, about a rotor hub 4, by the action of tidal water (not shown) passing across the rotor blades 3.

In more detail the cylindrical buoyancy tube 1 comprises a hollow main section, consisting of a multi-celled structure constructed from steel plate (or reinforced concrete), with a streamlined front section 12 and a sloped rear section 13 bonded to form one unit. The cylindrical buoyancy tube 1 may contain components such as transformers and possibly power conversion equipment (not shown). Access to within the body 1 is achieved utilising watertight hatches (not shown).

Hydrodynamic support keel sections 8 are attached to the cylindrical buoyancy tube 1, providing, if required, variable longitudinal-positioning of the lower rotor arm-section 6 which supports the subsea nacelle 5, rotor hub 4 and rotor blades 3. The keel section 8 consists of a multi-celled structure likely manufactured of steel.

The lower rotor arm-section 6 supporting the subsea nacelle 5, rotor hub 4 and rotor blades 3 is rotated about the hinged rotor arm joint 7 to allow it to be locked in position vertically in the operation mode (FIG. 2a) or horizontally in the transport mode (FIG. 2b) after rotation in the direction of arrow 'A'. The lower rotor arm-section 6 is operated hydraulically (not shown).

Rigidly connected to each lower rotor arm-section 6 is the subsea nacelle 5 which supports the rotor hub 4 and rotor blades 3. There are two rotor blades 3, (which may be fixed or variable pitch) on each rotor hub 4. Fixed pitch blades may be set in position or alternately a variable pitch system may be used. A variable pitch system allows automated control of the blade pitch angle in order to optimise performance.

There are a number of possible options (not shown) to take the power from the rotor blades 3 and deliver it at an appropriate shaft speed required to drive an electrical generator. The preferred option involves the use of a direct-drive generator contained within the watertight subsea nacelle 5. This eliminates the need for a gearbox, thereby reducing the number of rotating components and shortening energetic paths, resulting in less wear and tear, and leading to less maintenance requirements and longer life expectancy. Another option involves a gearbox and electrical generator arrangement contained within the watertight subsea nacelle 5. In both cases, the electrical energy would then be carried through cabling to a transformer located in the cylindrical buoyancy tube 1 and finally the export power cable would be routed along with a mooring yolk 10 and then to the seabed and ultimately to shore for connection to the electricity grid network. Alternatively the direct-drive generator, or gearbox and generator arrangement, may be contained in the cylindrical body 1 and connected to the rotor hub 4 through a direct perpendicular drive.

Other methods of power transmission from the rotor to electrical generator may also be used. For example, the rotor blades could drive through a hydraulic transmission generating means, wherein said generating means is preferably located within the vessel. Desirably the generator, and associated transformer means, control systems, hydraulic accumulators and the like are enclosed within the cylindrical buoyancy tube 1.

The system may also be used to create useful forms of energy other than electrical, for example hydraulic energy.

The simple passive mooring configuration, which allows the system to freely yaw into the local tidal direction, consists of a mooring joint 11 and a mooring yolk 10 connected via mooring arm hinged joints 9 to the cylindrical buoyancy tube 1. The mooring joint 11 is connected to a seabed anchor (not shown) by a single mooring line (not shown).

An automated ballasting system (not shown) may be installed within the front conical section 12. This may be automatically controlled for constantly keeping the apparatus level depending on the intensity of the tidal flow and the associated force on the rotor blades. Various other modifications may be made to the above described embodiments without departing from the scope of the present invention.

I claim:

1. A power generating apparatus suitable for use in extracting energy from the movement of water, comprising an elongate, generally circular in cross section, buoyancy vessel (1), the buoyancy vessel (1) having depending from its underside on a mounting means, a rotor (2) comprising rotor blades (3), connected to a power generating means, the rotor (2) being connected to the vessel (1) through the mounting means (5, 6) by a hinged joint (7) in a keel section (8) of the vessel (1), so as to be movable from a first, stowed position, adjacent to and immediately below the vessel (1), to a second deployed condition spaced from the vessel and facing the direction of tidal currents, whereby movement of water across the rotor blades (3) of the rotor (2), drives the rotor (2) so as to generate power in the power generating means.

2. The power generating apparatus as claimed in claim 1 wherein there are two rotors (2), each mounted on its own mounting means (5, 6).

3. The power generating apparatus as claimed in claim 2 wherein the two rotors are counter-rotating in use.

4. The power generating apparatus as claimed in claim 1 wherein, in the deployed condition, the rotor is mounted as close to the buoyancy vessel (1) as possible.

5. The power generating apparatus as claimed in claim 1 wherein there are two rotor blades (3) on the rotor (2) which, in the stowed or retracted position, are arranged so as to be parallel with the longitudinal axis of the vessel (1).

6. The power generating apparatus as claimed in claim 1 provided with mooring means (10, 11) formed and arranged for securing the apparatus to the seabed or other fixed point.

7. A power generating apparatus suitable for use in extracting energy from tidal movement of water, comprising an elongate, generally circular in cross section, buoyancy vessel (1), the buoyancy vessel (1) having depending from its underside on a mounting means (5,6), a rotor (2) comprising rotor blades (3), connected to a power generating device, the rotor (2) being connected to the vessel (1) through the mounting means by a hinged joint (7) on the vessel (1), so as to be movable from a first, stowed position adjacent to the vessel (1), such that the mounting means is immediately below and extends along the vessel (1), to a second deployed condition spaced from the vessel and facing the direction of tidal currents, whereby in use of the apparatus movement of water across the rotor blades (3) of the rotor (2), drives the rotor (2) so as to generate power in the power generating device.

8. A power generating apparatus suitable for use in extracting energy from tidal movement of water, comprising:
   an elongate buoyancy vessel (1);
   mounting means mounted on an underside of the vessel; and
   a rotor (2) comprising rotor blades (3), connected to a power generating device, the rotor (2) being connected to the vessel (1) through the mounting means by a hinged joint (7) on the vessel (1), so the rotor is movable from a first, stowed position adjacent to and immediately below the vessel (1) to a second deployed condition spaced from the vessel and facing the direction of tidal currents, whereby movement of water across the rotor blades (3) of the rotor (2), drives the rotor (2) so as to generate power in the power generating device.

9. The power generating apparatus according to claim 8, in which the rotor (2) is connected to the vessel (1) through the mounting means by the hinged joint (7) such that in the first, stowed position the rotor is immediately by and extends along the vessel.

\* \* \* \* \*